United States Patent [19]
Scaglione

[11] 3,826,466
[45] July 30, 1974

[54] FLUID FLOW CONTROL VALVE

[76] Inventor: Paul J. Scaglione, 30180 Richmond Hill Dr., Farmington, Mich. 48024

[22] Filed: Aug. 24, 1972

[21] Appl. No.: 283,574

[52] U.S. Cl. ............... 251/192, 137/546, 137/549, 137/625.29, 210/429, 210/432, 251/163, 251/310, 251/311
[51] Int. Cl. ...... B01d 35/02, F16k 5/02, F16k 5/04, F16k 5/06
[58] Field of Search ........... 251/163, 192, 310, 311; 137/614.16, 614.17, 625.24, 625.29, 625.32

[56] References Cited
UNITED STATES PATENTS

| | | | |
|---|---|---|---|
| 560,993 | 5/1896 | Heston | 251/163 |
| 663,646 | 12/1900 | Tait | 251/311 X |
| 1,504,219 | 8/1924 | Cryer | 251/163 X |
| 2,345,780 | 4/1944 | Whitfield | 137/625.29 |
| 2,515,252 | 7/1950 | Niederer, Jr. | 137/614.16 UX |
| 2,711,302 | 6/1955 | McWhorter | 251/163 |
| 2,988,319 | 6/1961 | Erwin | 251/163 |
| 3,208,719 | 9/1965 | Hulsey | 137/625.32 X |
| 3,394,735 | 7/1968 | Wurster | 137/625.32 |
| 3,707,161 | 12/1972 | Crawford | 137/614.17 X |

FOREIGN PATENTS OR APPLICATIONS

| | | | |
|---|---|---|---|
| 122,668 | 10/1900 | Germany | 137/614.16 |

*Primary Examiner*—Robert G. Nilson
*Attorney, Agent, or Firm*—Robert G. Mentag

[57] ABSTRACT

A fluid flow control valve having a valve body in which is formed a vertical elongated chamber. The valve body is provided with an inlet passage and an outlet passage, and with a stationary annular seal mounted around the inner end of each of said passages. A rotatable valve is operatively mounted between said annular seals. The rotatable valve is provided with means for releasably retaining the valve in a locked position when it is rotated to the closed position. The rotatable valve has a pair of chambers formed therein, with one of said chambers comprising an inlet chamber having an inlet port communicating with said inlet passage and a downwardly opening outlet port communicating with the lower end of said valve body chamber, and the other of said pair of chambers comprising an outlet chamber having an upwardly opening inlet port communicating with said valve body chamber and an outlet port communicating with said outlet passage, whereby fluid entering said inlet passage will pass through said rotatable valve inlet chamber and down into the lower end of said valve body chamber and thence upwardly around said rotatable valve and into said rotatable valve outlet chamber and into said outlet passage. The valve includes means mounted in the lower end of the valve body chamber for rotating the rotatable valve between open and closed positions. The lower end of the elongated valve body chamber is adapted to function as a sediment and condensate collection chamber. A valve means is operatively mounted in the valve body for regulating the flow of fluid from the upper end of the valve body chamber into the rotatable valve outlet chamber.

13 Claims, 13 Drawing Figures

3,826,466

FLUID FLOW CONTROL VALVE

SUMMARY OF THE INVENTION

This invention relates generally to fluid flow control valves, and more particularly, to a fluid flow control valve which can also provide a flow regulating function as well as a fluid flow function.

It is an important object of the present invention to provide a novel and improved fluid flow control valve which is adapted to carry out a plurality of functions as, for example, a fluid flow control function, a pressure temperature regulating function, and a fluid cleaning function.

It is still another object of the present invention to provide a novel and improved fluid flow control valve which is simple and compact in construction, economical to manufacture and efficient in operation.

It is a further object of the present invention to provide a novel and improved fluid flow control valve which includes a rotatable valve operatively mounted between inlet and outlet passages in a valve body, and wherein the rotatable valve is of a wedge design operatively mounted between a pair of stationary seals.

It is still another object of the present invention to provide a novel and improved fluid flow control valve having a rotatable valve with a wedge shaped design and which includes a wear plate around the wedge shaped valve to protect the valve surfaces from being eroded or worn by the fluid flowing around the outer sides of the valve.

It is still another object of the present invention to provide a novel and improved fluid flow control valve which is provided with a valve body having a vertical elongated chamber in which is operatively mounted a rotatable valve to direct the flow of fluid through the valve from an inlet passage and through the valve and thence downwardly into the lower end of the valve body chamber, and thence upwardly into the upper end of the valve body chamber, and thence downwardly through the rotatable valve again and out through an outlet passage. The lower end of the valve body chamber is adapted to function as a sediment and condensate function chamber, and a strainer means may be mounted in the lower end of the valve body chamber, if desired.

It is a further object of the present invention to provide a fluid flow control valve which includes a valve body having a chamber therein, an inlet passage communicating with said valve body chamber, and an outlet passage communicating with said valve body chamber at a point diametrically opposite to the inlet passage, an annular seal mounted around each of said passages and being disposed at the point where each of said passages communicates with said valve body chamber, a rotatable valve in said valve body chamber and being operatively seated between and against said annular seals, said rotatable valve having a pair of chambers formed therein with one of said chambers comprising an inlet chamber having an inlet port communicating with said inlet passage and an outlet port communicating with said valve body chamber, and the other of said pair of chambers comprising an outlet chamber having an inlet port communicating with said valve body chamber and an outlet port communicating with said outlet passage, whereby fluid entering said inlet passage will pass through said rotatable valve inlet chamber and into said valve body chamber and thence into said rotatable valve outlet chamber and into said outlet passage, and means releasably connected to said rotatable valve for rotating said rotatable valve to a first position to permit said flow of fluid from said inlet passage and through said rotatable valve to said outlet passage, and to a second position whereby the flow of fluid between the inlet passage and outlet passage is blocked by said rotatable valve.

Other objects, features and advantages of this invention will be apparent from the following detailed description, appended claims, and the accompanying drawings.

DESCRIPTION OF THE PREFERRED EMBODIMENTS

Figure 1:
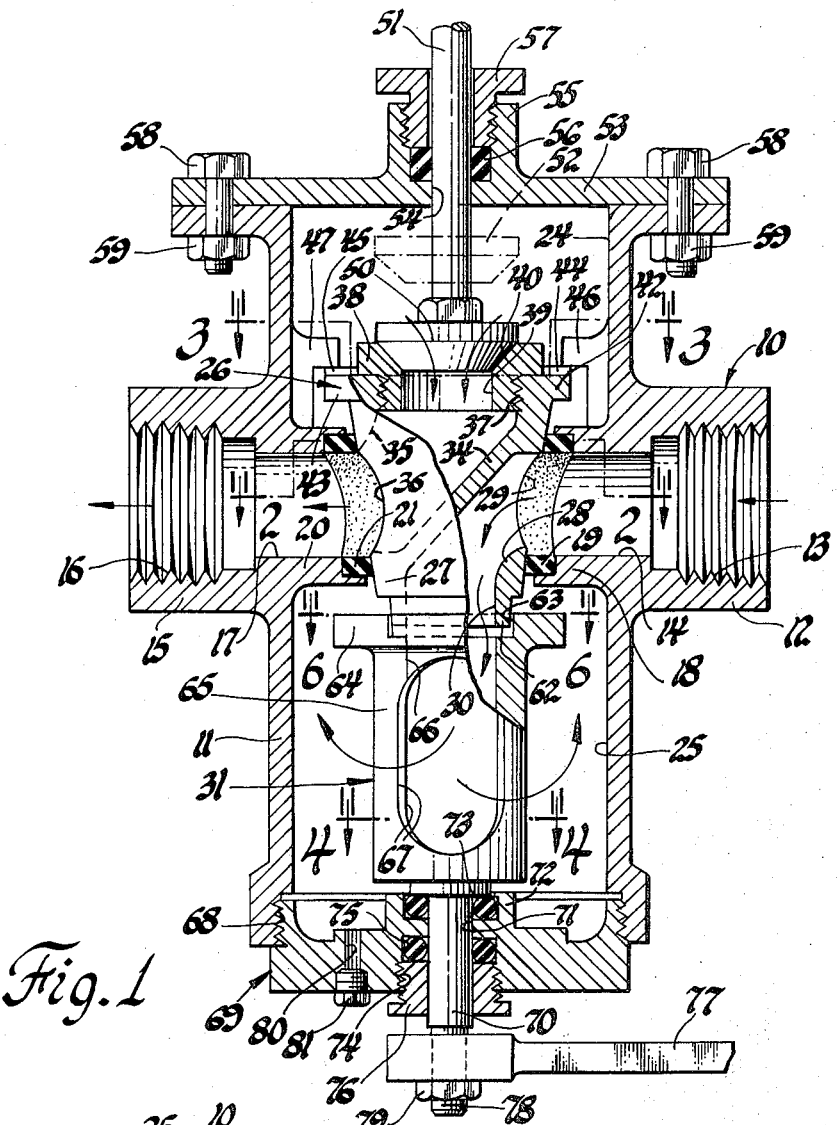
FIG. 1 is an elevational section view of an illustrative embodiment of a fluid flow control valve made in accordance with the principles of the present invention.

Referring now to the drawings, and in particular to FIGS. 1 through 6, the numeral 10 generally designates an illustrative fluid flow control valve made in accordance with the principles of the present invention. The valve 10 comprises a cylindrical body 11 which is provided with a threaded bore or inlet passage 13 formed through an integral lateral extension housing 12 on one side of the valve body 11. The inlet passage 13 comprises the high pressure side of the valve. The valve 10 is also provided with a threaded bore or outlet passage 16 formed through an integral, lateral extension housing 15 on the other side of the body 11 and at a position diametrically opposite to the inlet housing 12.

As shown in FIG. 1, the valve body 11 is provided with a cylindrical, inwardly extended integral projection 18 that extends inwardly into the valve body 11 in alignment with the inlet housing 12. A second cylindrical, inwardly extended integral projection 20 is formed diametrically opposite to the projection 18 and in alignment with the outlet housing 15. The inwardly extended cylindrical projections 18 and 20 are provided with the passages 14 and 17, respectively, therethrough which communicate with the inlet and outlet passages 13 and 16, respectively. The inwardly extended projections 18 and 20 also divide the valve chamber inside of the housing 11 into an upper portion 24 and a lower portion 25.

The flow of fluid between the inlet passage 13 and the outlet passage 16 is controlled by a rotatable valve generally indicated by the numeral 26, and illustrated as having a wedge-shaped or frustro-conical shaped body 27. A ring or annular stationary seal 19 is operatively mounted in a recess formed in the inner end of the inlet passage extension projection 18. A similar seal 21 is formed in a similar recess at the inner end of the outlet passage extension 17 formed in the inward projection 20. As viewed in FIG. 1, the seals 19 and 21 are wedge-shaped and they mate with the outer shape of the valve 26. The valve 26 is adapted to be mounted between the seals 19 and 21 by sliding the same downwardly between the seals 19 and 21.

As shown in FIG. 1, the rotatable valve 26 is provided with an inlet port 29 which communicates with the inlet passage extension 14. The valve 26 is provided with an inlet chamber or passage 28 which communicates with the inlet port 29. The inlet chamber 28 communicates with the lower end of the valve body chamber 25 through an outlet port 30. The lower end of the valve 26 is operatively engaged by a means 31 for rotating the valve, as more fully described hereinafter.

The rotatable valve 26 is provided with an internal chamber wall 34 which is disposed at an angle relative to the vertical axis of the valve so as to divide the interior of the valve 26 into two chambers to provide a second chamber or outlet chamber 35. The valve outlet chamber 35 is provided with an outlet port 36 which communicates with the outlet passage extension 17 and thence to the outlet passage 16. The valve outlet chamber 35 is provided with a threadably mounted opening 37 at the inlet thereof in which is threadably mounted a valve seat member 38 which provides an inlet port 39 at the inner end thereof for the chamber 35 and a conically shaped valve seat 40 at the outer end thereof.

Figure 3:
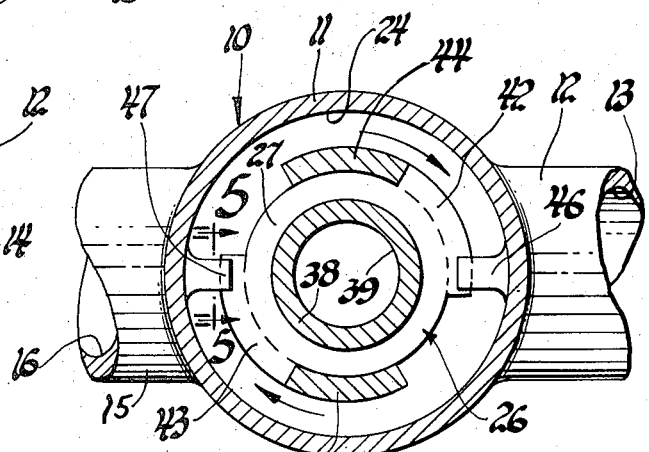
FIG. 3 is a horizontal section view of the valve structure illustrated in FIG. 1, taken along the line 3—3 thereof, and looking in the direction of the arrows.
Figure 4:
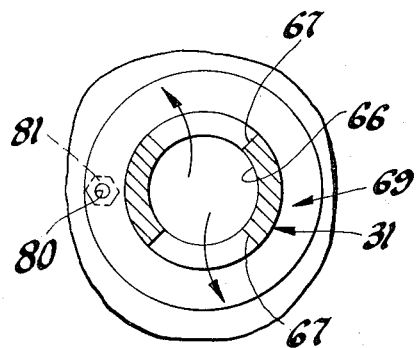
FIG. 4 is a horizontal section view of the valve structure illustrated in FIG. 1, taken along the line 4—4 thereof, and looking in the direction of the arrows.

As shown in FIGS. 1 and 3, the rotatable valve 26 is provided with a pair of oppositely disposed, outwardly extended flanges 42 and 43 which are provided with upwardly sloping cam surfaces, in a counterclockwise direction, as viewed in FIG. 3.

The flanges or ears 42 and 43 do not extend around the complete periphery of the valve 26, whereby the valve 26 can be moved downwardly between the seals 19 and 21, and past a pair of diametrically opposite disposed lips or projections 46 and 47 on the valve body 11. As viewed in FIG. 3, it will be seen that the valve 26 would be rotated counterclockwise a little distance from the position shown in FIG. 3 so as to permit the lips 46 and 47 to pass between the slots or notches formed by the adjacent ends of the flanges 42 and 43.

After the valve 26 has been moved downwardly below the lips 46 and 47, it is then turned clockwise as viewed in FIG. 3, so as to move the flanges or ears 42 and 43 under the lips 46 and 47. When the valve 26 is turned to the closed position, the high ends 44 and 45 on the sloping upper cam faces of the flanges 42 and 43 will be moved under the lips 46 and 47 to wedge the valve downwardly into tight sealing engagement with the seals 19 and 21. When the valve 26 is moved counterclockwise to the open position shown in FIGS. 1, 2 and 3, the flanges 42 and 43 are still under the lips 46 and 47 to retain the valve in an operative position between the seals 19 and 21.

Figure 5:
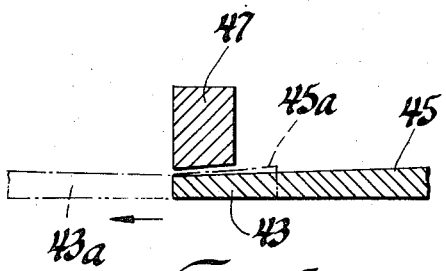
FIG. 5 is a fragmentary, elevational section view of the valve structure illustrated in FIG. 3, taken along the line 5—5 thereof, and looking in the direction of the arrows.
Figure 6:
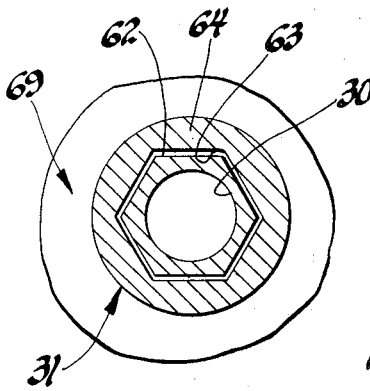
FIG. 6 is a horizontal section view of the valve structure illustrated in FIG. 1, taken along the line 6—6 thereof, and looking in the direction of the arrows.

FIG. 5 is a fragmentary illustration of flange 43 in the open position of the valve, and the broken line position 43a indicates the position of the flange 43 when the valve has been turned to the closed position, with the high end of the upper face of the flange 43 moved to the position 45a under the lip 47 to wedge the valve downwardly into tight sealing position against the seals 19 and 21.

As shown in FIG. 1, the valve of the present invention is provided with a regulating, conically shaped valve 50 which is adapted to be seated on the valve seat 40 for regulating the flow of fluid through the inlet port 39 into the outlet chamber 35 in the valve 26. The valve 50 is provided with an upwardly extended conventional valve stem 51 for moving the valve 50 between the closed solid line position shown in FIG. 1 and the open position as shown by the dotted lines and indicated by the numeral 52. It will be understood that the valve stem 51 may be operatively connected to any suitable type of operator, as, for example, the bellows type operator shown in U.S. Pat. No. 3,493,008.

As shown in FIG. 1, the valve stem 51 extends upwardly through a hole 54 in a valve body top end cover plate 53 which is releasably secured to a suitable flange on the upper end of the valve body 11 by a plurality of bolts 58 and nuts 59. The valve stem 51 extends through the cover plate opening 54 and into a packing chamber formed in a packing housing 55. The valve stem 51 extends through a suitable packing 56 which is secured in place by a suitable packing ring 57 that is threadably mounted in the packing housing 55.

Figure 2:
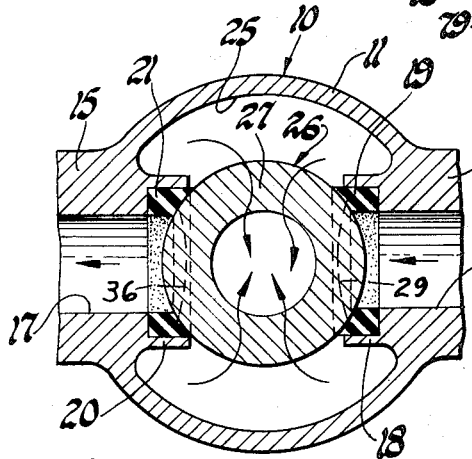
FIG. 2 is a horizontal section view of the valve structure illustrated in FIG. 1, taken along the line 2—2 thereof, looking in the direction of the arrows, and showing the valve in an open position to allow flow therethrough.

As shown in FIGS. 1 and 2, the rotatable valve 26 is provided with an integral, downwardly extended lower end shaft 62 which is provided on the outer peripheral surface thereof with a hexagonal shape. The outlet port 30 is extended down through the hexagonal shaped end shaft 62. The valve shaft 62 is adapted to be extended into a mating hexagonal recess 63 formed in the upper end of the means 31 for rotating the valve 26. As illustrated in FIGS. 1 and 2, the valve turning means 31 includes a hollow cylindrical drive or turning shaft 65 which is provided with an integral, outwardly extended flange 64. The hexagonal recess 63 is formed in the upper end of the cylindrical drive shaft 65 which is vertically disposed in the lower end 25 of the valve chamber in the valve body 11. A passage 66 is formed in the upper end of the cylindrical turning shaft 65 and it communicates with the valve outlet port 30 and the passage 28 in the valve 26. The passage 66 communicates with the valve chamber lower end 25 through a plurality of elongated openings or outlet ports 67 formed through the side wall of the shaft 65.

As shown in FIG. 1, the lower end of the valve body 11 is open, and it is internally threaded as indicated by the numeral 68. Threadably mounted in the lower open threaded end 68 of the valve body 11 is a valve chamber lower head cover generally indicated by the numeral 69. A turning shaft 70 is integrally formed on the lower end of the cylindrical shaft 65 and it is axially disposed and extends downwardly through a central bore 71 formed through the lower head cover 69. An inwardly extended integral collar 72 is formed around the inner end of the bore 71, and in it is seated a suitable O-ring seal 73 against which abuts a reduced lower end portion of the valve turning shaft 65. The lower end of the bore 71 is enlarged and threaded as indicated by the numeral 74. A suitable O-ring seal 75 is operatively mounted in the inner end of the threaded bore 74 and it is operatively secured in place around the turning shaft 70 by a suitable threaded retainer ring 76. The lower end of the shaft 70 is threaded, as indicated by the numeral 78, and it receives one end of a suitable turning handle 77 which is secured in place by a suitable lock nut 79. The valve chamber lower head cover 69 is provided with a drain passage 80 therethrough which is enclosed at its outer end by a suitable threadably mounted drain plug 81.

In use, the valve structure illustrated in FIGS. 1 through 6 would be operatively mounted in a fluid flow system with the operating handle 77 disposed in a position shown in FIG. 1 to permit flow through the valve 10 from the upstream or high pressure passage 13 to the downstream or low pressure passage 16. The regulating valve 50 would be operated by a suitable pressure or temperature regulation means. The fluid entering the passage 13 would flow into the inlet port 29 and through the passage 28 and out through the outlet port 30 and into the passage 66. The fluid would then pass through the openings 67 and into the lower end 25 of the valve chamber. The fluid would then pass around the valve 26 into the upper end 24 of the valve chamber and then downwardly into the inlet port 39 and through the passage 35 and out the port 36 and into the outlet passage 16.

It will be seen that the lower head cover 69 can be quickly and easily removed for cleaning the valve. The control or turning handle 77 would be turned in a clockwise direction, as viewed in FIG. 3, so as to move the valve 26 to a blocking position to block the flow through the valve body. The head cover 69 would then be removed to clean any collected sediment or dirt from the lower end 25 of the valve chamber. It will be seen that lower end 25 of the valve chamber acts as a sediment and collection chamber for solids that collect within it by gravity from the fluid flowing therethrough. The condensate from steam and moisture from compressed air will also be collected in the lower end chamber 25. It will be seen that by turning the handle 77 90° from the open position, that all flow is stopped between the upstream passage 13 and the downstream passage 16, and the regulating elements can be inspected or removed from the valve body 11. The valve of the present invention thus functions as a regulating valve and as a fluid cleaning apparatus, as well as functioning as a fluid flow control apparatus and complete shut-off apparatus.

Figure 7:
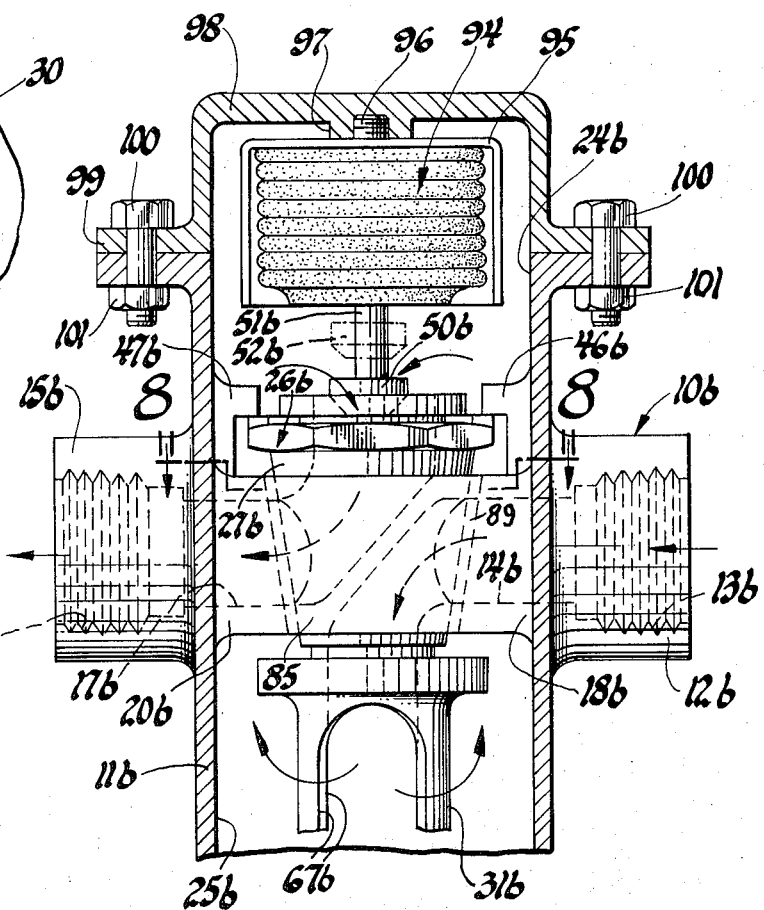
FIG. 7 is an elevational view, partly in section, of a second embodiment of the invention employing a bellows-type control regulator, and a wear plate for the rotatable valve.
Figure 8:
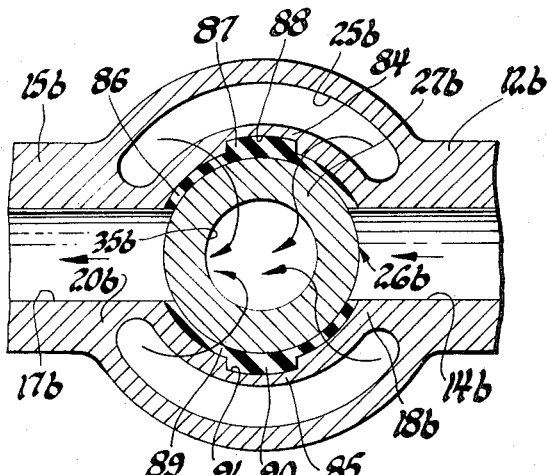
FIG. 8 is a horizontal section view of the valve structure illustrated in FIG. 7, taken along the line 8—8 thereof, and looking in the direction of the arrows.

FIGS. 7 and 8 illustrate a second embodiment of the invention wherein the wedge-shaped, rotatable valve 26b is operatively mounted between a pair of wear plates. The parts of the embodiment of FIGS. 7 and 8 which are the same as the corresponding parts of the embodiment of FIGS. 1 through 6 are marked with the same reference numerals followed by the small letter b. As best seen in FIG. 8, the pair of wear plates 84 and 85 are integrally formed on opposite sides of the rotatable valve 26b. The wear plates 84 and 85 are arcuate in plan view and they protect the outer surfaces of the rotatable valve 26b from being eroded or worn by the fluid flowing upwardly from the lower chamber 25b into the upper chamber 24b. A pair of arcuate wedge type seals 86 and 89 are mounted on the inner faces of the wear plates 84 and 86, respectively. The wear plate 84 is provided with a vertically disposed groove 88 in which is slidably mounted an integral, vertically extended tongue 87 on the outer face of the seal 86. The tongue 87 prevents the seal 86 from being turned when the rotatable valve 26b is turned. The wear plate 85 is provided with a similar groove 91 and the seal 89 is provided with a similar tongue 90.

As shown in FIG. 7, the regulator valve 51b is provided with a bellows, generally indicated by the numeral 94, for moving the regulating valve 50b between the solid line closed position, and the broken line open position indicated by the numeral 52b. The bellows 94 may be any conventional or standard thermostatic trap element to regulate flow. The illustrated bellows 94 is carried in a frame 95 which is operatively mounted by means of a threaded stub shaft 96 in a threaded hole in a collar 97 integrally formed on the inner side of the valve chamber top cover 98. The cover 98 is provided with a flange 99 which is releasably secured to the flange on the valve body 11b by any suitable means, as by a plurality of bolts 100 and nuts 101. The valve structure of FIGS. 7 and 8 functions in the same manner as the previously described valve structure of FIGS. 1 through 6. The valve structure of FIGS. 7 and 8 would be provided with the same turning structure illustrated in FIG. 1.

FIGS. 9, 10, 11 and 12 are elevational, section views of variously shaped rotating valve structures which may be employed in a valve made in accordance with the principle of the present invention. The parts of the valve structure of FIGS. 9, 10, 11 and 12 which are the same as the corresponding parts of the valve structure illustrated in FIGS. 1 through 6 have been marked with the same reference numerals followed by the small letters c, d, e and f, respectively. The rotating valves 26c, 26d, 26e and 26f would first be mounted in their wedge-shaped seals and then the assembled seal and valve unit would be forced downwardly into the operative position in the valve housing. The rotating valves illustrated in FIGS. 9, 10, 11 and 12 would function in the same manner as the rotating valve 26 illustrated in FIGS. 1 through 6. The valves 26c, 26d, 26e and 26f would be provided with the same sloping cam flanges for wedging the valve tightly in position under the locking ears on the valve body. The lower ends of the rotating valves 26c, 26d, 26e and 26f would also be provided with a hexagonal shape, or any other suitable shape, for mating with a turning means 31 in the same manner as the valve illustrated in FIG. 1.

Figure 9:
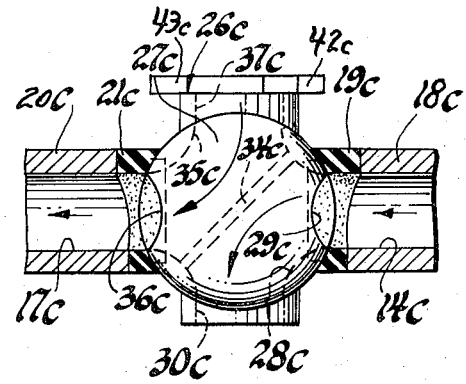
FIGS. 9, 10, 11 and 12 are side elevational views with parts of the valve structure in section, showing four different types of rotatable valves which may be used in the invention in lieu of the frustro-conical shaped valve of FIG. 1.
Figure 10:
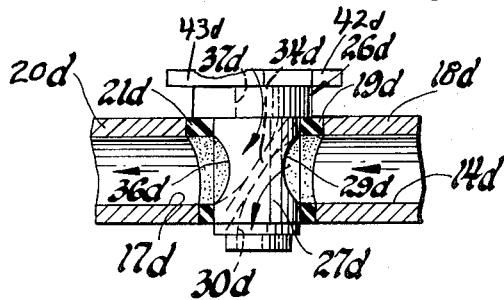
Figure 11:
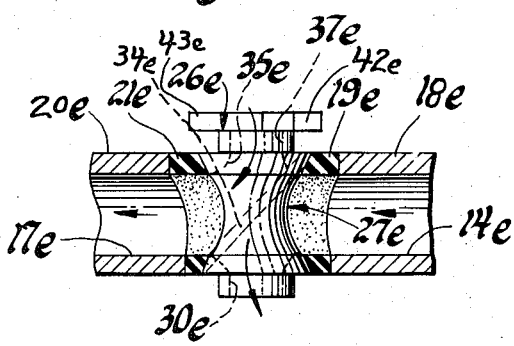
Figure 12:
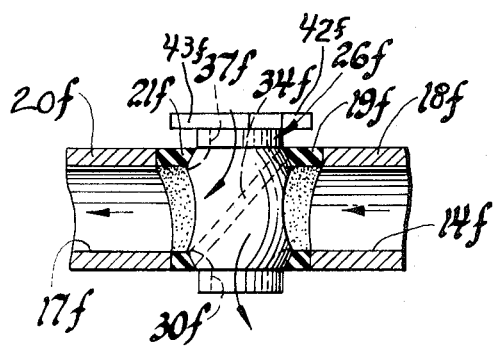

FIG. 9 shows a rotating valve 26c having a ball shaped outer configuration. FIG. 10 shows a rotating valve 26d having a cylindrical outer shape. FIG. 11 shows a rotating valve 26e having a cylindrical concave outer shape. FIG. 12 shows a rotating valve 26f having a cylindrical convex outer shape.

Figure 13:
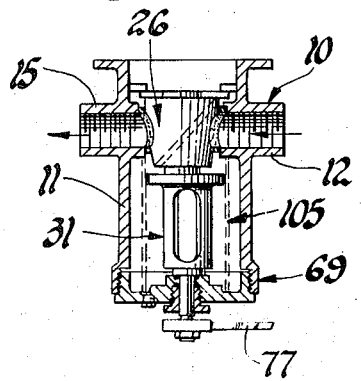
FIG. 13 is a longitudinal, elevational, section view of the frustro-conical valve structure of FIG. 1 provided with a strainer.

FIG. 13 illustrates the valve structure of FIG. 1 provided with a suitable strainer element generally indicated by the numeral 105. Although the valve of the present invention can function to clean condensate and solid dirt from a fluid flow system, a suitable tubular strainer as 105 may be employed, if desired. The strainer 105 may be inserted in the valve body 11 by removing the lower end cover 69, so as to remove the cover 69 and the turning means as a unit. The strainer 105 may then be slipped over the turning means 31 and the cover 69 is then replaced in the valve body.

While it will be apparent that the preferred embodiments of the invention herein disclosed are well calculated to fulfill the objects above stated, it will be appreciated that the invention is susceptible to modification, variation and change.

What I claim is:

1. A fluid flow control valve comprising:
    a. a valve body having a valve chamber therein;
    b. an inlet passage communicating with said valve body valve chamber and an outlet passage communicating with said valve body valve chamber at a point diametrically opposite to the inlet passage;
    c. an annular seal around each of said passages and being disposed at the point where each of said passages communicates with said valve body valve chamber;
    d. a rotatable valve in said valve chamber having an upper end and a lower end and being operatively seated between and against said annular seals;
    e. said rotatable valve being rotatable between a first position and a second position and having a pair of chambers formed therein with one of said chambers comprising an inlet chamber having a sidewardly facing inlet port communicating with said inlet passage when the rotatable valve is in a first position and a downwardly facing outlet port communicating with said valve body valve chamber through the lower end of the valve, and the other of said pair of chambers comprising an outlet chamber having an upwardly facing inlet port communicating with said valve body valve chamber through the upper end of the valve and a sidewardly facing outlet port communicating with said outlet passage when the valve is in a first position, whereby fluid entering said inlet passage will pass directly into and through said rotatable valve inlet chamber and downwardly into said valve body valve chamber and thence upwardly through only said valve chamber and around the outside of said valve and thence downwardly into said rotatable valve outlet chamber and directly into said outlet passage; and,
    f. means releasably connected to said rotatable valve for rotating said rotatable valve to a first position to permit said flow of fluid from said inlet passage and through said rotatable valve and only said valve chamber to said outlet passage, and to a second position whereby the flow of fluid between the inlet passage and outlet passage is blocked by said rotatable valve.

2. A fluid flow control valve as defined in claim 1, wherein:
    a. said rotatable valve includes inner surfaces which are arranged to form said inlet and outlet chambers and direct fluid flow through the rotatable valve between said inlet passage and said outlet passage when the rotatable valve is rotated to said first position.

3. A fluid flow control valve as defined in claim 2, wherein:
    a. each of said annular seals comprises stationary seals.

4. A fluid flow control valve as defined in claim 3, wherein:
    a. said annular seals comprise wedge shaped seals.

5. A fluid flow control valve as defined in claim 4, wherein:
    a. the outer surface of said rotatable valve is formed to stop flow between said inlet and outlet passages when the rotatable valve is rotated to said second position.

6. A fluid flow control valve as defined in claim 4, wherein:
    a. said rotating valve is frustro-conically shaped in outer elevational configuration.

7. A fluid flow control valve as defined in claim 4, wherein:
    a. said rotating valve is ball shaped in outer elevational configuration.

8. A fluid flow control valve as defined in claim 4, wherein:
    a. said rotating valve is cylindrically shaped in outer elevational configuration.

9. A fluid flow control valve as defined in claim 8, wherein:
    a. said cylindrically shaped rotating valve has longitudinal straight sides.

10. A fluid flow control valve as defined in claim 8, wherein:
    a. said cylindrically shaped rotating valve has longitudinal concave sides.

11. A fluid flow control valve as defined in claim 8, wherein:
    a. said cylindrically shaped rotating valve has longitudinal convex sides.

12. A fluid flow control valve as defined in claim 4, including:
    a. cam means for releasably retaining said rotating valve in an operative position between said wedge shaped seals.

13. A fluid flow control valve as defined in claim 4, wherein:
    a. a wear plate is formed in said valve body around each of the outer sides of said rotating valve and said wedge shaped seals are operatively mounted in recesses formed in the inner faces of said wear plates.

* * * * *